July 27, 1926.

C. L. C. MAGEE ET AL

FRICTION BRAKE MECHANISM

Filed April 6, 1925

1,594,180

Inventors
Chauncey L. C. Magee
Benjamin S. Pfeiffer

Patented July 27, 1926.

1,594,180

UNITED STATES PATENT OFFICE.

CHAUNCEY L. C. MAGEE AND BENJAMIN S. PFEIFFER, OF CHICAGO, ILLINOIS.

FRICTION BRAKE MECHANISM.

Application filed April 6, 1925. Serial No. 20,915.

This invention relates to friction brake mechanism in general, such as those ordinarily employed on motor vehicles.

Generally stated, the object of the invention is to provide a novel and improved construction whereby the torque of the rotating element is utilized to develop the power necessary, or some portion thereof, to apply the friction brake mechanism to stop or retard the rotation of said element.

It is also an object to provide certain details and features of construction and combinations tending to increase the general efficiency and the desirability of a self-operating, so to speak, friction brake mechanism of this particular character.

To these and other useful ends, the invention consists in the matters hereinafter set forth and claimed, and shown in the accompanying drawings in which,—

Figure 1:
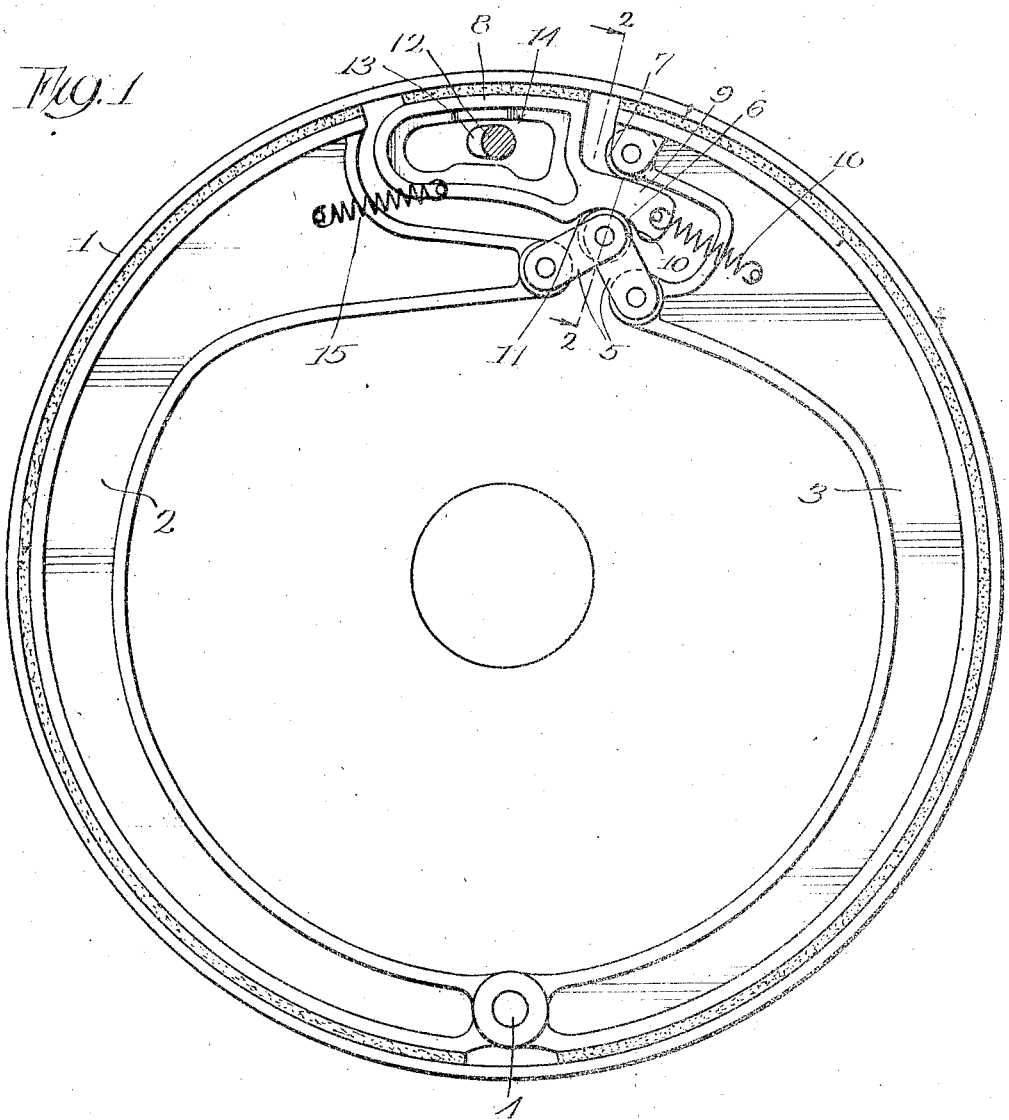
Fig. 1 is a side elevation of a friction brake mechanism embodying the principles of the invention.
Figure 2:
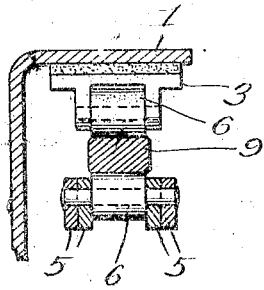
Fig. 2 is a detail section on line 2—2 in Fig. 1.

As thus illustrated, the invention comprises the rotating element 1, or friction drum, such as those on the hubs of motor vehicles. The friction brake mechanism is all inside of this drum, and comprises the two members 2 and 3, which are pivoted together at 4, so that they can swing apart, the outer sides of these members having suitable material for engagement with the inner surface of the flange of the drum (see Fig. 2). The two members are connected together by toggle links 5, and the toggle joint has a roller 6, and a similar roller 7 is mounted on the member 3, as shown. A loose or floating friction member 8 is disposed between the upper ends of the members 2 and 3, in the manner shown, and is provided with a tail portion 9 disposed between the rollers 6 and 7 previously mentioned. It will be seen that this tail portion has an inclined or beveled surface at 10, and a similar one at 11, whereby if the member 8 is shifted to the left the surface 10 will react against the roller 6 and tend to crowd the two rollers apart, thus causing the toggle joint to straighten and crowd the members 2 and 3 apart at their upper ends. On the other hand, if the member 8 is moved to the right hand, the incline or bevel or cam surface 11 will react against the roller 6 and cause the two rollers to be crowded apart, thus straightening the toggle and setting the brake members 2 and 3 forcibly against the inner surface of the drum.

For the operation of the brake mechanism, therefore, a horizontal shaft 12 is provided with a cam 13 for engaging the inner edge 14 of the member 8, and for thereby crowding this member upwardly against the drum. When this is done, the member 8 will be inclined to move with the drum, in either direction, depending upon which way the drum is rotating. Such displacement of the member 8 will cause the tail piece 9 to crowd the two rollers 6 and 7 apart, thus straightening the toggle and causing the members 2 and 3 to exert pressure against the inner surface of the drum. Thus the power necessary to push the member 8 forcibly against the inner surface of the drum may be comparatively slight, and the necessary braking action is then brought about by the utilization of the torque of the rotating element, so that the rotation of the element to be stopped or retarded is really developed into power to set the brake mechanism.

Springs 15 and 16 may be applied, as shown, to hold the member 8 yieldingly in normal position. It will also be understood, of course, that the brake mechanism with its pivot 4 is suitably mounted on any stationary support, such as the axle housing of the ordinary motor vehicle, and that the shaft 12 may be supported and operated in any suitable or desired manner, as by means of a foot pedal (not shown) so connected that it will be operative to rotate or rock the shaft 12 sufficiently to raise the member 8 and thereby automatically, so to speak, set the brake mechanism by means of the torque or rotation of the vehicle wheel.

It will be seen that the cam 13 when moved downwardly will engage the member 8 and press it downwardly away from the inner surface of the drum, thus releasing the brake mechanism. Preferably, this is the normal position of the cam, thereby keeping the member 8 from vibrating and from rubbing against the inner surface of the drum.

What we claim as our invention is:—

1. In friction brake mechanism, a rotating element, brake shoe means in position to operatively engage said element to stop or retard the rotation thereof, and instrumentalities comprising a friction member for engaging said rotating element to utilize the torque or rotation thereof to operate said brake shoe means, said instrumentalities comprising a toggle joint, and means having a wedging action between said joint and a portion of the brake shoe and whereby displacement of said friction member by the rotation of said element is operative through said toggle joint to set the brake shoe means against the rotating element.

2. In friction brake mechanism, a rotating element, brake shoe means in position to operatively engage said element to stop or retard the rotation thereof, and instrumentalities comprising a friction member for engaging said rotating element to utilize the torque or rotation thereof to operate said brake shoe means, said brake shoe means comprising two shoes pivoted together at one end and separated at their other ends, and said instrumentalities comprising a toggle joint connection between the separated ends of the shoes, together with a roller on said toggle joint, a similar roller on one of said brake shoes, said friction member having a portion interposed between said rollers and formed to crowd said rollers apart when said member is moved in either direction by the rotation of said rotating element.

3. In friction brake mechanism, a rotating element, brake shoe means in position to operatively engage said element to stop or retard the rotation thereof, and instrumentalities comprising a friction member for engaging said rotating element to utilize the torque or rotation thereof to operate said brake shoe means, said friction member being displaceable by the rotation of said rotating element, and said instrumentalities comprising means rigid with said friction member and having a wedging action between the other elements and operated by said displacement to set the brake mechanism.

4. The combination of a drum, friction shoes pivoted together and formed to engage the drum, a friction member between the ends of said shoes, a toggle connection between said ends of the shoes; means to operate said toggle to push the shoes into engagement with the drum, operated by said member, and means to cause said member to engage the drum, thereby to operate the toggle.

Specification signed this 30th day of March, 1925.

CHAUNCEY L. C. MAGEE.
BENJAMIN S. PFEIFFER.